United States Patent

Kishi et al.

Patent Number: 5,183,836
Date of Patent: Feb. 2, 1993

[54] COMPOSITE PAINT

[75] Inventors: Hiroyuki Kishi, Yokohama; Hitoshi Kimura, Chigasaki; Katsuya Yamamoto, Yokohama; Yoshinobu Tamura, Sagamihara; Tsuneo Sakauchi; Nagaoka, both of Yokohama; Yasuyu Tsuchiya, Hirakata, all of Japan

[73] Assignees: Nissan Motor Co., Ltd., Yokohama; Nippon Paint Co., Ltd., Osaka, both of Japan

[21] Appl. No.: 784,096

[22] Filed: Oct. 28, 1991

Related U.S. Application Data

[63] Continuation of Ser. No. 521,863, May 11, 1990, abandoned.

[30] Foreign Application Priority Data

May 18, 1989 [JP] Japan .................................. 1-122819

[51] Int. Cl.$^5$ .................................................... C08K 3/20
[52] U.S. Cl. ................................. 523/404; 204/181.7; 428/416; 428/425.8; 524/591
[58] Field of Search .......................... 428/416, 425.8; 204/181.7; 523/404; 524/591

[56] References Cited

U.S. PATENT DOCUMENTS

| | | | |
|---|---|---|---|
| 4,104,147 | 4/1978 | Marchetti et al. | 204/181.7 |
| 4,476,212 | 10/1984 | Kakimi | 430/137 |
| 4,619,746 | 10/1986 | Delaney et al. | 204/181.1 |
| 4,711,917 | 12/1987 | McCollum et al. | 523/400 |
| 4,732,950 | 3/1988 | Nagai et al. | 525/524 |
| 4,761,337 | 8/1988 | Guagliardo et al. | 428/425.8 |
| 4,879,325 | 11/1989 | Kimura et al. | 523/404 |
| 4,916,019 | 4/1990 | Nakatani et al. | 428/418 |

FOREIGN PATENT DOCUMENTS

| | | |
|---|---|---|
| 1303480 | 1/1973 | United Kingdom . |
| 2052526 | 1/1981 | United Kingdom . |

OTHER PUBLICATIONS

European Search Report, Jan. 29, 1992, Application No. EP 90 30 5440.

Primary Examiner—Paul J. Thibodeau
Assistant Examiner—D. S. Nakarani
Attorney, Agent, or Firm—Pennie & Edmonds

[57] ABSTRACT

A composite paint for an automotive outer panel comprises an electrodeposition paint film coated on the surface of a steel sheet. The electrodeposition paint film has a minimum melt viscosity not less than 0.2 during hardening and consists essentially of a water paint composition in an amount ranging from 50 to 85 parts by weight upon conversion to a solid content, and a partially cross-linked resin in an amount ranging from 15 to 50 parts by weight upon conversion to a solid content. Additionally, an intermediate paint film is coated on the electrodeposition paint film and has a hardening starting time ranging from 15 to 20 minutes.

8 Claims, 1 Drawing Sheet

COMPOSITE PAINT

This is a continuation of Ser. No. 07/521863, filed on May 11, 1990, now abandoned.

BACKGROUND OF THE INVENTION

1. Field of the Invention

This invention relates to improvements in a composite paint coated on a steel plate for the purpose of improving rust resistance of the steel plate and a gloss and brightness character of the coated paint, and more particularly to such an improved composite paint to be coated on the outer panel of an automotive vehicle.

2. Description of the Prior Art

In general, a composite paint film arrangement for an automotive vehicle outer panel is constituted of an electrodeposition paint film for the purpose of rust prevention, an intermediate coat paint film for the purpose of thickening the composite film arrangement, and a finish coat paint film for the purpose of coloring. The automotive vehicle outer panel coated with such a composite paint film arrangement is required to have higher smoothness, gloss and the like. Total evaluation of such characteristics has been usually accomplished with a so-called PGD value which is measured by a PGD (Portable Gloss and Distinction) meter. This PGD meter is, for example, the PGD-3 type one produced by a Japan Colour Research Institute in Japan. It is known to those skilled in the art, that the PGD value becomes higher as the smoothness and gloss of the finish coating film is higher. Here, the gloss (or a gloss and brightness character) of the composite paint film arrangement depends on the performance of the finish coat paint film and seems to be an independent function of a finish coat paint. Concerning the smoothness, it is largely affected by the smoothness of under-coat films and therefore the electrodeposition paint film is eagerly required to have a high smoothness.

In the conventional electrodeposition film, a measure to raise its fluidity (i.e., to lower its melt viscosity) during baking has been taken in order to improve the smoothness of the electrodeposition film. There is an Oscillated Pendulum Analysis (OPA) with an oscillated pendulum type viscoelasticity measuring device, as a method of measuring the fluidity of an electrodeposition film during baking. The degree of the fluidity can be represented by the minimum melt viscosity ($\lambda$min) determined by the measuring method.

Conventional electrodeposition paints have a minimum melt viscosity ($\lambda$min) of 0.15 or lower according to the above measuring method. In connection with such electrodeposition paints, intermediate coat paints are designed so as to harden for as short a time as possible in order to ensure the smoothness of the coated paint film on a horizontal plane and to prevent deterioration of the smoothness of the same film on a vertical plane which smoothness deterioration is caused by run of the coated paint film during baking. Additionally conventional intermediate coat paints have a hardening starting time, measured by the Oscillated Pendulum Analysis (OPA), from 2 to 15 minutes. Thus, the conventional composite paint film arrangements are formed by coating an intermediate coat paint film having a hardening starting time shorter than 15 minutes (according to OPA) on the electrodeposition paint film having a minimum melt viscosity ($\lambda$min) of 0.15 or lower (according to OPA).

In such conventional paint film arrangements, the measure to increase the flowability of the coated electrodeposition paint film as discussed above has been taken. However, under the action of surface tension of the molten coated film at an edge portion of the steel plate of the automotive vehicle outer panel, the edge of the steel plate is exposed without the coat film, so that the above-discussed conventional composite paint film arrangement is inferior in so-called edge corrosion resistance.

If the edge corrosion resistance is intended to be improved in the conventional composite film arrangements, it may be proposed to increase the viscosity of the electrodeposition paint film in a molten condition. For this purpose, there are proposed a measure to increase the concentration of pigment in the electrodeposition paint (i.e., P(pigment)/B(binder) ratio), a measure to add non-molten type cross-linking resin particles (i.e., a reology control agent) to the electrodeposition paint, and a measure to lower the hardening temperature to suppress flowing of the electrodeposition paint in a molten state under a cross-linking reaction. These measures are disclosed, for example, in Japanese Patent Publication Nos. 55-34238 and 56-34186. However, any of these measures largely degrades the flowability of the electrodeposition paint in a molten state. Assuming that these measures are taken to obtain a good edge corrosion resistance, the smoothness of the coated surface of the electrodeposition paint is unavoidably deteriorated. Accordingly, in a case in which conventional intermediate and finish coats are formed on the thus formed electrodeposition paint film, the PGD value of the finish coat paint film on a horizontal plane largely lowers, thereby degrading a commercial value of the resultant automotive vehicle.

In view of the above, it has been eagerly desired in an automotive industry to obtain a composite paint exhibiting both high edge corrosion resistance and high external appearance.

SUMMARY OF THE INVENTION

As a result of a variety of researches and developments for a composite paint exhibiting high edge corrosion resistance and high external appearance, the inventors have experimentally found that the PGD value on a horizontal plane is lowered while no change of the same value is made on a vertical plane, in a painting system which is constituted by coating conventional intermediate and finish coat paints on the surface of an electrodeposition paint film whose flowability is lowered (See Comparative Examples 1 and 2). Taking account of this, the relationship between the degrees of deterioration of smoothness (due to run) on the vertical plane and the hardening starting time measured by the OPA has been studied. As a result, it has been confirmed that in a case of the intermediate coat paint having a hardening starting time not more than 20 minutes, the PGD value on the vertical plane after coating of the finish coat paint is the same as when the conventional intermediate coat paint is used (See Comparative Examples 1 to 10).

Besides, it has been confirmed that the same result is obtained for the vertical plane even in a case of using a low flowability electrodeposition paint; however, the PGD value on the horizontal plane is different according to the electrodeposition paints and intermediate coat paints used (See Comparative Examples 1 to 15).

The inventors' extensive researches and developments taking account of the above-discussed experimental results have revealed that improvements in both high edge corrosion resistance and high external appearance can be realized by a composite paint of the present invention.

The composite paint of the present invention comprises a first paint film (I) formed of cathodic electrodeposition paint composition and having a minimum melt viscosity not less than 0.2 during hardening. The minimum melt viscosity is determined according to a logarithmic decrement of viscoelasticity of the first paint film and by an oscillated pendulum type viscoelasticity measuring device. The composite paint of the present invention further comprises a second paint film (II) coated on the first paint film. The second paint film has a hardening starting time ranging from 15 to 20 minutes. The hardening starting time is determined according to a logarithmic decrement of viscoelasticity of the second film and by the oscillated pendulum type viscoelasticity measuring device.

The cathodic electrodeposition paint composition consists essentially of a water paint composition (A) in an amount ranging from 50 to 85 parts by weight upon conversion to a solid content, and a partially cross-linked resin (B) formed by heating a water-dispersed composition. The partially cross-linked resin is in an amount ranging from 15 to 50 parts by weight upon conversion to a solid content.

The water paint composition consists essentially of a reaction product (A-1) formed by a reaction between an epoxy resin having a number average molecular weight ranging from 1000 to 3000 and at least one epoxy group per molecule on an average and containing a residual bisphenol A, and a monatomic secondary amine. The reaction product (A-1) is in an amount ranging from 60 to 80 parts by weight. The water paint composition further consists essentially of a blocked reaction product (A-2) formed by a reaction between a compound having 1 to 8 carbon atoms and having one OH group per molecule on an average, and a compound having at least two NCO groups per molecule on an average. The blocked reaction product is in an amount ranging from 20 to 40 parts by weight upon conversion to a solid content.

The water dispersion composition for the partially cross-linked resin (B) consists essentially of methylol phenol compound (B-1) having an average molecular weight ranging from 200 to 1000. The methylol phenol is formed by a reaction between phenol and formaldehyde. The methylol phenol compound is in an amount ranging from 20 to 50 parts by weight upon conversion to a solid content. The water dispersion composition further consists essentially of an addition reaction product (B-2) formed by an addition reaction of 50 to 200 millimol of a monatomic secondary amine to 100 parts by weight of a polybutadiene resin having an average molecular weight ranging from 1000 to 3000 and an oxirane oxygen concentration ranging from 4 to 8 percent by weight. The addition reaction product is an amount ranging from 50 to 80 parts by weight upon conversion to a solid content.

The thus configurated composite paint of the present invention can offer significant advantages of greatly improving both the edge corrosion resistance of a steel plate and the external appearance (or the gloss and brightness character) of the coated paint film after application of the finish coat paint.

DETAILED DESCRIPTION OF THE INVENTION

Figure 1:
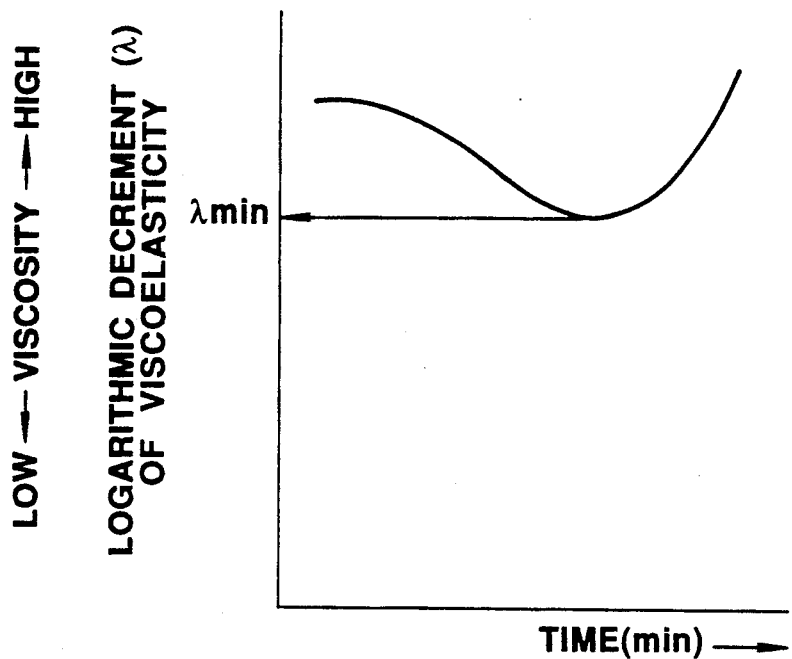
FIG. 1 is a graph showing the relationship between time and logarithmic decrement, for the purpose of determining the minimum melt viscosity ($\lambda$min) of the first or electrodeposition paint film of the composite paint according to the present invention.

According to the present invention, a composite paint comprises a first paint film (I) and a second paint film (II). The first paint film (I) is formed of a cathodic electrodeposition paint composition and has a minimum melt viscosity not less than 0.2 during hardening. The minimum melt viscosity is determined according to a logarithmic decrement of viscoelasticity of the first paint film and by an oscillated pendulum type viscoelasticity measuring device. The first paint film (I) is coated on the surface of, for example, a steel plate forming part of a automotive vehicle body outer panel. The second paint film (II) is coated on the first paint film and has a hardening starting time ranging from 15 to 20 minutes. The hardening starting time is determined according to a logarithmic decrement of viscoelasticity of the second film by the oscillated pendulum type viscoelasticity measuring device.

The cathodic electrodeposition paint composition consists essentially of a water paint composition (A) in an amount ranging from 50 to 85 parts by weight upon conversion to a solid content, and a partially cross-linked resin (B) formed by heating a water dispersion composition. The partially cross-linked resin is in an amount ranging from 15 to 50 parts by weight upon conversion to a solid content.

The water paint composition consists essentially of a reaction product (A-1) formed by a reaction between an epoxy resin having a number average molecular weight ranging from 1000 to 3000 and at least one epoxy group per molecule on an average and containing a residual bisphenol A, and a monatomic secondary amine. The reaction product (A-1) is in an amount ranging from 60 to 80 parts by weight upon conversion to a solid content. The water paint composition further consists essentially of a blocked reaction product (A-2) formed by a reaction between a compound having 1 to 8 carbon atoms and having one OH group per molecule on an average, and a compound having at lest two NCO groups per molecule on an average. The blocked reaction product is in an amount ranging from 20 to 40 parts by weight upon conversion to a solid content.

The water dispersion composition for the partially cross-linked resin (B) consists essentially of methylol phenol compound (B 1) having an average molecular weight ranging from 200 to 1000. The methylol phenol compound is formed by a reaction between phenol and formaldehyde. The methylol phenol compound is in an amount ranging between 20 to 50 parts by weight upon conversion to a solid content. The water dispersion composition further consists essentially of an addition reaction product (B-2) formed by an addition reaction of 50 to 200 millimol of a monatomic secondary amine to 100 parts by weight of a polybutadiene resin having an average molecular weight ranging from 1000 to 3000 and an oxirane oxygen concentration ranging from 4 to 8 percent by weight. The addition reaction product is an amount ranging from 50 to 80 parts by weight upon conversion to a solid content.

More specifically, the water paint composition (A) of the first or electrodeposition paint film (I) consists essentially of the reaction product or cationic resin (A-1) and the blocked reaction product or blocked isocyanate cross-linking agent (A-2). The cationic resin (A-1) has a number average molecular weight ranging from 1000 to 3000 and an amino group containing polymer (solubilized with acid) or the reaction product produced by a reaction between epoxy resin having at least one epoxy group per molecule on an average and containing a residual group of bisphenol A, and monatomic secondary amine. It will be understood that the residual group is a group bondable with other atoms or groups. Examples of the cationic resin (A-1) are Epikote Nos. 1001, 1002, 1004 (which are trade names of Shell Kagaku Kabushiki Kaisha in Japan) and reaction products formed by esterification, etherification and imidification which means conversion into the form of imide. The content of the cationic resin (A-1) in the water paint composition (A) has been determined to be within the range from 60 to 80 parts by weight upon conversion to a solid content for the reasons set forth below. If the content of the cationic resin is lower than 60 parts, corrosion resistance of a coated steel plate (particularly the edge corrosion resistance) is deteriorated. If the content of the cationic resin exceeds 80 parts by weight, hardening of the electrodeposition film is insufficient.

Examples of the blocked reaction product or blocked isocyanate cross-linking agent (A-2) are aromatic or aliphatic isocyanate such as 2,4- or 2,6-tolylene diisocyanate, hexamethylene diisocyanate, m- or p-phenylene diisocyanate. Formation of the blocked isocyanate cross-linking agent requires a blocking agent for isocyanate. Examples of the blocking agent are aliphatic or aromatic monoalcohol such as methanol, ethanol, butanol, 2-ethylhexanol. The content of blocked isocyanate cross-linking agent (A-2) in the water paint composition (A) has been determined to be within the range from 20 to 40 parts by weight upon conversion to a solid content. If the content of the blocked isocyanate cross-linking agent is less than 20 parts, hardening of the coated electrodeposition paint film is insufficient. If the content exceeds 40 parts, the water-solubility of the water paint composition (A) is insufficient so as to lower the stability of the electrodeposition paint composition.

The partially cross-linked resin (B) of the first or electrodeposition paint film (I) is obtained by heat-treating the water dispersion composition which consists essentially of the methylol phenol compound (B-1) and the addition reaction product or amine-added polybutadiene resin (B-2). The methylol phenol compound and the addition reaction product are dispersed in water. Examples of the methylol phenol compound are resol-type phenol resin and phenol ether compound. The resol-type phenol resin is available, for example, as Tamanol 720 and Tamanol 721 (the trade names of Arakawa Chemical Industries Co., Ltd in Japan) and as WP561 and WP201 (the trade names of Gun-ei Chemical Industry Co., Ltd in Japan). The content of the methylol phenol compound (B-1) in the partially cross-linked resin (B) has been determined within the range from 20 to 50 parts by weight upon conversion to a solid content for the reasons set forth below. If the content is less than 20 parts by weight, the hardening of the coated electrodeposition film is insufficient. If the content exceeds 50 parts by weight, the corrosion resistance is deteriorated.

An example of the amine-added polybutadiene resin is one which is prepared by epoxidation (with peracetic acid) of polybutadiene resin having a number average molecular weight of 1000 to 3000 and 30 to 100% of 1, 2-bond and by addition of amine. Such an amine-added polybutadiene resin is available as C-1800-6 and C-1800-5 (the trade names of Nippon Petrochemicals Co., Ltd in Japan). The content of the amine-added polybutadiene resin (B-2) in the partially cross-linked resin (B) has been determined to be within the range from 50 to 80 parts by weight for the reasons set forth below. If the content is less than 50 parts by weight, the partially cross-linked resin is insufficient in water-solubility thereby lowering the stability of gel particles. If the content exceeds 80 parts by weight, gelation is insufficient within a gel particle thereby to lower than ability to cover the edge of a steel plate to be painted.

The ratio (A/B) in parts by weight of the water paint composition (A) and that of the partially cross-linked resin (B) in the electrodeposition paint film (I) is determined to be within a range from 50/50 to 85/15 upon conversion to a solid content. If the ratio is lower than 50/50 (A/B), i.e., the content of the water paint composition (A) exceeds 50 parts by weight, the edge corrosion resistance is improved while the smoothness of the coated o electrodeposition paint film is lowered thus providing unbalance in corrosion resistance and smoothness of the coated paint film. If the ratio is higher than 85/15 (A/B), i.e., the content of the partially cross-linked resin (B) is less than 15 parts by weight, the appearance of the coated electrodeposition paint film is improved while the edge corrosion resistance is insufficient thus providing unbalance in the corrosion resistance and appearance of the coated paint film.

In addition, the minimum melt viscosity of the electrodeposition paint composition is required to be not less than 0.2. If the minimum melt viscosity is less than 0.2, the electrodeposition paint composition is inferior in the edge corrosion resistance. The minimum melt viscosity is determined according to a logarithmic decrement of viscoelasticity measured by the oscilated pendulum type viscoelasticity measuring device. The minimum melt viscosity not less than 0.2 is obtained by the mixture of the water paint composition (A) and the partially cross-linked resin (B) in the blended ratio of 1/1 (A/B) to 1/0.18 (A/B).

An intermediate (second) coat paint film (II) is coated on the first paint film (I) of the electrodeposition paint composition. The intermediate coat film is formed by coating an intermediate coat paint composition having the hardening starting time ranging from 15 to 20 minutes, determined according to the logarithmic decrement of viscoelasticity measured by the oscillated pendulum type viscoelasticity measuring device. The range of the hardening starting time has been determined for the reasons set forth below. If the time is less than 15 minutes, it is difficult to smooth the unevenness of the surface of the electrodeposition paint film. If the time exceeds 20 minutes, smoothing the surface of the electrodeposition paint film is sufficiently achieved on a horizontal plane; however, run of the intermediate coat paint occurs on a vertical plane.

The method of determining the minimum melt viscosity of the electrodeposition paint and the hardening starting time of the intermediate coat paint will be discussed.

Minimum Melt Viscosity (λmin)

The viscoelasticity of the electrodeposition paint was measured according to Oscillated Pendulum Analysis (OPA) or by an oscillated pendulum type viscoelasticity measuring device (the trade name "Rheo-Vibron DDV-OPA") produced by Orientic Corporation in Japan->under conditions of a weight: 22 g, moment of inertia: 859 g.cm², and temperature rising rate: 20° C./min. In the course of this viscoelasticity measurement, the lowest logarithmic decrement (λmin) was measured to obtain the minimum melt viscosity (λmin). FIG. 1 illustrates a method for determining the minimum melt viscosity (λmin) for the electrodeposition paint.

Hardening Starting Time (t)

Figure 2:
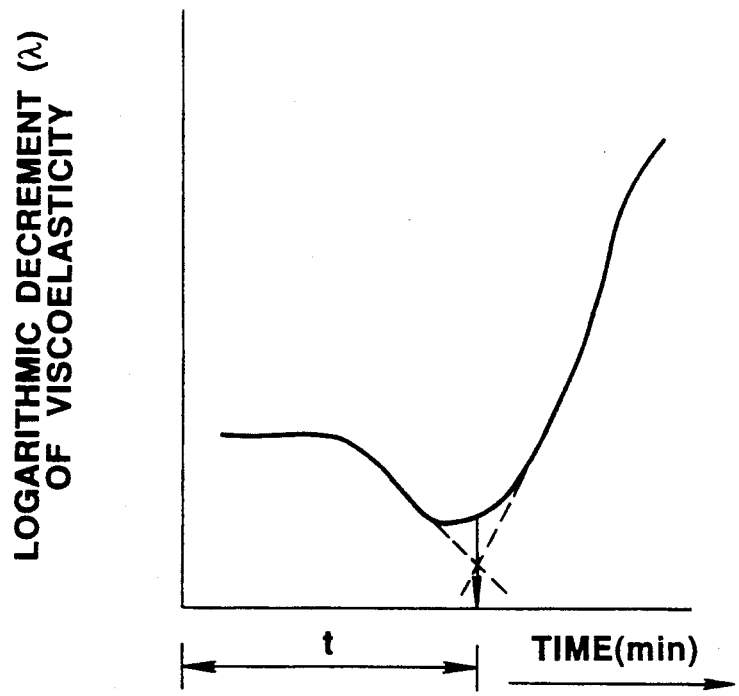
FIG. 2 is a graph showing the relationship between time and logarithmic decrement, for the purpose of determining the hardening starting time (t) of the second or intermediate paint film of the composite paint according to the present invention.

The viscoelasticity of the intermediate coat paint was measured according to Oscillated Pendulum Analysis (OPA) or by the oscillated pendulum type viscoelasticity measuring device (the trade name "Rheo-Vibron DDV-OPA") produced by Orientic Corporation in Japan, under conditions of a weight: 22 g, moment of inertia: 859 g.cm², and heating schedule: heating at 40° C. for 5 minutes→temperature rising at a rate of 10° C./min and for 10 minutes→keeping heating at 140° C. In the course of this viscoelasticity measurement, a time duration (t) between a time point of starting heating and a time point of starting in rise of a logarithmic decrement of viscoelasticity as shown in FIG. 2 was determined to obtain the hardening starting time (t). FIG. 2 illustrates a method for determining the hardening starting time (t) for the intermediate coat paint.

EXPERIMENT

In order to evaluate the composite paint of the present invention, discussion will be made on a variety of experiments concerning production of the electrodeposition paint and the intermediate coat paint and Examples and Comparative Examples of the composite paint film arrangement obtained by combining the above paints.

Production of Electrodeposition Paint

Production 1

AMINO GROUP-CONTAINING EPOXY RESIN 1-(A)

970 g of EPON 1001 having an epoxy equivalent of 485 and 265 g of polycaprolactone diol (the trade name "PCP 0200" of Union Carbide Corp. in U.S.A.) were supplied into a suitable reactor. The content of the reactor was heated at 100° C. in an atmosphere of nitrogen, and then 0.46 g of dimethylbenzyl amine was added into the reactor. The content or reaction mixture in the reactor was further heated at 130° C. and maintained at the same temperature for 1.5 hours. This batch was cooled to 110° C., and then 110 g of methylisobutyl ketone was added thereto. Subsequently 39.8 g of 73% methylisobutyl ketone solution of methylisobutyl diketimine of diethylenetriamine was added to the batch, and then 100 g of methylisobutyl ketone was further added to the same batch. Thereafter the reaction was cooled until the temperature of the batch reached 70° C. At this temperature, 53.1 g of diethylene amine was added, and then the temperature of the batch was raised to 120° C. and kept for 3 hours. Thereafter, the reaction mixture or vanish was taken out.

Production 2

PREPARATION OF BLOCKED ISOCYANATE 1-(B)

218 g of 2-ethylhexanol was added to 291 g of a mixture (weight ratio: 80/20) of 2,4-toluene-diisocyanate and 2,6-toluenediisocyanate in an atmosphere of dried nitrogen under stirring while cooling was made from the outside thereby to keep the reaction temperature at 38° C., thus preparing polyurethane cross-linking agent. The thus prepared polyurethane cross linking agent was maintained at 38° C. for 0.5 hour. Subsequently the temperature of the reaction mixture was raised to 60° C., upon which 75 g of trimethylol propane was added and then 80 mg of dibutyltin dilaurate was added. The batch was maintained at 121° C. for 1.5 hours until whole residual isocyanate groups confirmed by infrared spectrum or the like were substantially consumed after the first heat generation. This batch was diluted with 249 g of ethyleneglycol ether thus to obtain an object or blocked isocyanate (in the form of varnish) having a solid content of 70%.

PREPARATION OF PIGMENT PASTE

Production 3

An acid salt of organic tertiary amine was prepared according to the following manner:

| Component | Raw materials Parts by weight | Solid Content (%) |
|---|---|---|
| 2-ethylhexanol half-capped toluene diisocyanate (in methylisobutyl-ketone) | 320.0 | 304 |
| dimethylethanolamine | 87.2 | 87.2 |
| lactic acid aqueous solution | 117.6 | 88.2 |
| butyl cellosolve | 39.2 | — |

Preparation 2-ethylhexanol half-capped toluene diisocyanate was added to dimethylethanol amine in a suitable reactor, in which the reaction mixture generated heat. The reaction mixture was stirred at 80° C. for 1 hour. Subsequently, lactic acid was supplied into the reactor, and then butyl cellosolve was added into the reactor. The reaction mixture was stirred at 65° C. for about 0.5 hour thus providing a quaternizing agent.

A resin vehicle was prepared using the above quaternarizer, in the following manner:

| Component | Raw materials Parts by weight | Solid Content (%) |
|---|---|---|
| Epon 829ª⁾ | 710.0 | 681.2 |
| Bisphenol A | 289.6 | 289.6 |
| 2-ethylhexanol half-capped toluene diisocyanate (in methylisobutylketone) | 406.4 | 386.1 |
| Quarternarizer of Production 3 | 496.3 | 421.9 |
| deionized water | 71.2 | — |

-continued

| Component | Raw materials Parts by weight | Solid Content (%) |
|---|---|---|
| butyl cellosolve | 56.76 | — |

Note
[a]EPON 829 is a reaction product between epichlorohydrin and bisphenol and has an epoxy equivalent of 193 to 203. It is the trade name of Shell Chemical Company and available on the market.

Preparation

Epon 829 and bisphenol A were supplied into a suitable reactor and heated at a temperature of 150° to 160° C. in an atmosphere of nitrogen. Subsequently the reaction mixture in the reactor was cooled to 120° C. and supplied with 2-ethylhexanol half-capped toluene diisocyanate. The temperature of the reaction mixture was kept at 110° to 120° C. for about 1 hour. Then butyl cellosolve was added to the reaction mixture.

Next, the reaction mixture was cooled to 85° to 95° C. and homogenized. Then water was added to the reaction mixture and then the quaternizing agent was added to the same. The temperature of the reaction mixture was kept at 80° to 85° C. until the acid value of the reaction mixture reached 1, thereby providing a resin vehicle.

41 parts by weight of deionized water was added to 21 parts by weight of the thus prepared epoxy-modified cationic resin vehicle, upon which they were homogeneously dissolved to obtain a solution. Thereafter 18 parts by weight of kaoline, 6 parts by weight of titanium oxide and 1 part by weight of carbon black were added to the solution and homogeneously dissolved. Thereafter dispersion was repeatedly accomplished by using a SG mill until the maximum particle size becomes 10 u or smaller. Then, 37 parts by weight of deionized water was added to the solution, thus providing a pigment paste having a non-volatile content of 35% by weight.

Production 4

AMINO GROUP-CONTAINING POLYBUTADIENE A

Epoxidation of "Nisseki Polytutadiene B-2000 (the trade name of Nippon Petrochemicals Co., Ltd., number average molecular weight: 2000, 1,2 bond: 65%)" was carried out with peracetic acid thereby producing an epoxidated polybutadiene having an oxirane oxygen content of 6.4% by weight.

1000 g of the thus obtained epoxidated polybutadiene and 354 g of ethyl cellosolve were supplied to a 2 liter autoclave. Then, 62.1 g of dimethyl amine was added into the autoclave, upon which a reaction was carried out at 150° C. for 5 hours. Unreacted amine was distilled out thereby producing a solution of amino group-containing polybutadiene. The solution had an amine value of 120 millimole/100 g (in solid content) and a non-volatile content of 75% by weight.

Production 5

AMINO GROUP-CONTAINING POLYBUTADIENE B

Epoxidation of "Nisseki Polybutadiene B-2000 (number average molecular weight: 2000, 1,2 bond: 65%)" was carried out with peracetic acid thereby producing an epoxidated polybutadiene having an oxirane oxygen content of 6.4% by weight.

1000 g of the thus obtained epoxidated polybutadiene and 354 g of ethyl cellosolve were supplied to a 2 liter autoclave. Then, 62.1 g of dimethyl amine was added into the autoclave, upon which a reaction was carried out at 150° C. for 5 hours. After unreacted amine was distilled out, the reaction mixture was cooled to 120° C. Then a mixture of 79.3 g of acrylic acid, 7.6 g of hydroquinone and 26.4 g of ethyl cellosolve was added to the reaction mixture, upon which a further reaction was carried out at 120° C. for 3 hours and 45 minutes, thereby producing a solution having an amine value of 85.2 millimole/100 g, an acid value of 10.0 millimole/100 g and a solid content concentration of 75.4% by weight.

| Component | Raw Materials Parts by weight | Solid Content (%) |
|---|---|---|
| Amino group-containing polybutadiene resin A | 100 | 75 |
| Tamanol 722[b] | 33.3 | 25 |
| Glacial acetic acid | 2.8 | |
| Deionized water | 363.9 | |

Note
[b]Tamanol 722 is a resol-type phenol resin and the trade name of Arakawa Chemical Industries Co., Ltd.

Preparation 33.3 parts by weight of Tamanol 722 and 2.8 parts by weight of glacial acetic acid were added to 100 parts by weight of the amino group containing polybutadiene of the Production 4 to form a mixture. Furthermore, 2.8 parts by weight of glacial acetic acid was added to the mixture, and thereafter a sufficient stirring was made to the mixture. 363.9 parts by weight of deionized water was added to the mixture to be emulsified thereby to form a resin emulsion A. When a part of the thus formed resin emulsion A was sampled and added to tetrahydrofuran in an amount of 100 times the amount of the resin emulsion A, it was dissolved transparently.

Solvent was removed from the resin emulsion A under vacuum while adding deionized water. Subsequently, the resin emulsion A was maintained at 95° C. for 6 hours and then cooled thereby providing a cationic gel particulate dispersion liquid. This dispersion liquid was not be able to transparently dissolve in tetrahydrofuran and became cloudy.

Next, a tinned sheet-iron was dipped in the gel particulate dispersion liquid having a non-volatile content of 10% by weight, and dried in air. Then, the surface of the tinned sheet-iron coated with the gel particulate was observed by an electron microscope, in which the particulates having particle sizes smaller than 100 nm were confirmed to be coated on the surface of the tinned sheet-iron.

| Component | Raw materials Parts by weight | Solid Content (%) |
|---|---|---|
| Amino group-containing polybutadiene resin B | 100 | 75 |
| Tamanol 722[b] | 33.3 | 25 |
| Glacial acetic acid | 2.8 | |
| Deionized water | 363.9 | |

Note
[b]Tamanol 722 is a resol-type phenol resin and the trade name of Arakawa Chemical Industries Co., Ltd.

Preparation 33.3 parts by weight of glacial acetic acid were added to 100 parts by weight of the amino group-containing polybutadiene of Production 5 to form a mixture. Furthermore, 2.8 parts by weight of glacial acetic acid was added to the mixture, and thereafter a sufficient stirring was made to the mixture. 363.9 parts by weight of deionized water was added to the mixture to be emulsified thereby to form a resin emulsion B. When a part of the thus formed resin emulsion A was sampled and added to tetrahydrofuran in an amount of 100 times the amount of the resin emulsion A, it was dissolved transparently.

Solvent was removed from the resin emulsion B under vacuum while adding deionized water. Subsequently, the resin emulsion A was maintained at 95° C. for 6 hours and then cooled thereby providing a cationic gel particulate dispersion liquid. This dispersion liquid was not be able to transparently dissolve in tetrahydrofuran and became cloudy.

Next, a tinned sheet-iron was dipped in the gel particulate dispersion liquid having a non-volatile content of 10% by weight, and dried in air. Then, the surface of the tinned sheet-iron coated with the gel particulate was observed by an electron microscope, in which the particulates having particle sizes smaller than 100 nm were confirmed to be coated on the surface the tinned sheet-iron.

Production 8

An emulsion was prepared by the following manner:

| Component | Raw materials Parts by weight | Solid Content (%) |
|---|---|---|
| Varnish of Production 1 | 824 | 700 |
| Varnish of Production 2 | 429 | 300 |
| Dibutyltindilaurate | 10 | 10 |
| Glacial acetic acid | 15 | |
| Deionized water | 1579 | |

824 parts by weight of the varnish of Production 1, 429 parts by weight of the varnish of Production 2 and 10 parts by weight of dibutyltin dilaurate were taken into a container equipped with a stirrer and stirred to be homogenized. After 15 parts by weight of glacial acetic acid was added into the container, 1579 parts by weight of deionized water was slowly added into the same container, thus providing a homogeneous emulsion having a non-volatile content of 35% by weight.

| Component | Raw Materials Parts by weight | Solid Content (%) |
|---|---|---|
| Pigment paste of Production 3 | 990 | 350 |
| Emulsion of Production 8 | 1860 | 650 |
| Gel particulate dispersion liquid of Production 6 | 1000 | 200 |
| Deionized water | 2150 | |

Preparation 990 parts by weight of the pigment paste of Production 3, 1860 parts by weight of the emulsion of Production 8 and 1000 parts by weight of the gel particulate dispersion liquid of Production 6 were taken into a stainless steel container. 2150 g of deionized water was slowly added to the content of foam, thus preparing an electrodeposition paint.

Production 10

An electrodeposition paint was prepared in the same manner as that of Production 9 with the exception that 1000 parts by weight of the gel particulate dispersion liquid of Production 6 was replaced with 1000 parts by weight of the gel particulate dispersion liquid of Production 7.

Production 11

An electrodeposition paint having a solid content of 250 parts by weight was prepared in the same manner as that of the Production 9 with the exception that the amount of the gel particulate dispersion liquid of Production 6 was changed from 1000 parts by weight to 1250 parts by weight.

Production 12

An electrodeposition paint having a solid content of 400 parts by weight was prepared in the same manner as that of Production 9 with the exception that the amount of the gel particulate dispersion liquid of Production 6 was changed from 1000 parts by weight to 2000 parts by weight.

Production 13

An electrodeposition paint having a solid content of 125 parts by weight was prepared in the same manner as that of Production 9 with the exception that the amount of the gel particulate dispersion liquid of Production 6 was changed from 1000 parts by weight to 625 parts by weight.

Production 14

An electrodeposition paint having a solid content of 700 parts by weight was prepared in the same manner as that of Production 9 with exception that the amount of the 9el particulate dispersion liquid of Production 6 was changed from 1000 parts by weight to 3500 parts by weight.

Production 15

An electrodeposition paint was prepared in the same manner as that of Production 9 with the exception that the gel particulate dispersion liquid of Production 6 was not added.

Production 16

An electrodeposition paint having a solid content of 100 parts by weight was prepared in the same manner as that of Production 9 with the exception that the amount of the gel particulate dispersion liquid of Production 6 was changed from 1000 parts by weight to 500 parts by weight.

Production 17

An electrodeposition paint having a solid content of 800 parts by weight was prepared in the same manner as that of Production 9 with the exception that the amount of the gel particulate dispersion liquid was changed from 1000 parts by weight to 4000 parts by weight.

Concerning the above experiments, Productions 9 to 14 are productions for Examples according to the present invention, while Productions 15 to 17 are productions for Comparative Examples.

Intermediate (second) coat paints of the present invention can be produced according to methods known in the art. In other words, predetermined pigments, vehicles and solvents are mixed by means of a dispersing device such as a sand grind mill, a ball mill, a roll mill or the like thereby pulverizing and dispersing pigment. Subsequently, vehicles, solvents and additives are added and stirred homogeneously according to the purposes, thus providing the intermediate coat paints.

Production 18 to Production 22

INTERMEDIATE COAT PAINT

First, a resin solution of polyester resin modified by ε-caprolactone was produced as follows:
Raw materials are listed below.

| Isophthalic acid | 66.45 parts |
|---|---|
| Adipic acid | 14.62 parts |
| Tetrachlorophthalic anhydride | 15.20 parts |
| Trimethylpropane | 10.14 parts |
| Neopentyl glycol | 43.02 parts |
| 1,6-hexanediol | 26.41 parts |
| ε-caprolactone | 17.30 parts |
| Total | 193.17 parts |

The above-mentioned five kinds of the above-listed raw materials except for tetrachlorophthalic anhydride and ε-caprolactone were supplied to a chemical reactor equipped with a heating device, a stirring device, a recirculating device, a water separator, a rectifying device, and a thermometer, and were heated. When the starting materials were molten to such an extent that stirring is possible, stirring was started. The temperature in the reactor was raised to 200° C., in which temperature rise was made at a constant temperature raising rate during a time lapse of 3 hours within a temperature range of from 160° to 220° C. Produced condensed water was removed from the reaction system. When the reaction temperature reached 220° C., hot insulation was made. 30 minutes after the hot insulation, 3 parts of xylol as a recirculation solvent was gradually added into the reactor, so that the reaction was changed to a condensation in the presence of the solvent, thus continuing the reaction. When a resin acid value had reached 2.0, the reaction was terminated and the reaction temperature was lowered to 100° C., so that a first polyester prepolymer was obtained.

Subsequently 15.20 parts of tetrachlorophthalic anhydride was supplied into the reactor. The temperature in the reactor was raised to 150° C. When the temperature had reached 150° C., hot insulation was made to continue the reaction. Time-lapse sampling was accomplished, maintaining the temperature at 150° C. When the resin acid value was confirmed to be constant at 20, the reaction was terminated and the reaction was cooled, thus obtaining a second polyeseter prepolymer.

Next 17.30 parts of ε-caprolactone was supplied to the reactor. The temperature in the reactor was raised to 150° C. When the temperature had reached 150° C., hot insulation was made to continue the reaction. Time-lapse sampling was carried out maintaining the temperature of 150° C., tracing unreacted ε-caprolactone by IR. The reaction was terminated at the time at which a convertion had reached a value not less than 98%. Then cooling was made. After cooling, 39.87 parts of xylol was added, thereby obtaining the resin solution of polyester resin modified by ε-caprolactone. The solution had a non-volatile content of 79.7% and a resin acid value of 18.6.

The above-discussed production method of the resin solution of polyester resin modified by ε-caprolactone is disclosed in Japanese Patent Provisional Publication No. 61-209278.

The thus produced resin solution of polyester resin modified by ε-caprolactone was mixed with melamine resin, controlling a blending ratio (the resin solution/melamine resin). The melamine resin was Cymel 303 (trade name of Mitsui Cyanamid Co., Ltd. in Japan). The intermediate coat paint was prepared according to the detail shown in Table 1. In Table 1, "Solvesso" is the trade name of a dilution thinner produced by Exxon Chemical Co., Ltd. and includes a high boiling point aromatic (petroleum)solvent as a major component. "Surface controlling agent" is a silicone additive produced by Toray Dowcorning Silicone Co., Ltd. in Japan.

TABLE 1

| Production No. | 18 | 19 | 20 | 21 | 22 |
|---|---|---|---|---|---|
| Titanium white | 63 | 63 | 63 | 63 | 63 |
| Solution of polyester resin modified by ε-caprolactone (solid content 80 wt %) | 70 | 75 | 80 | 83 | 85 |
| Solvesso 150 | 14 | 14 | 14 | 14 | 14 |
| Melamine resin | 30 | 25 | 20 | 17 | 15 |
| Methanol | 8 | 8 | 8 | 8 | 8 |
| Surface controlling agent | 9 | 9 | 9 | 9 | 9 |
| The solution of polyester resin/melamine resin (solid content ratio) | 2.3/1 | 3/1 | 4/1 | 4.9/1 | 5.7/1 |
| Hardening starting time according to OPA (min) | 13 | 15 | 20 | 23 | 25 |

Preparation of Plate Coated with Electrodeposition Paint

An electrodeposition painting with the electrodeposition paints of Productions 9 to 17 was carried out onto an automotive steel sheet treated with zinc phosphate, under such conditions that the average film thickness of the coated electrodeposition film after baking became 20 microns. The baking was taken place at 175° C. for 30 minutes. Thus, nine kinds of plates coated with different electrodeposition paints were prepared. The automotive steel sheet was used as a cathode in the electrodeposition painting and produced by Nippon Test Panel Industry Co., Ltd. in Japan. The automotive steel sheet had an average surface roughness of 0.9 micron.

Painting Method of Intermediate and Finish Coat Paints

The above-mentioned intermediate paints of Production Nos. 18 to 22 were coated on the above nine kinds of electrodeposition paint coated-steel sheet by spray-painting to have a coat film thickness of 30 to 40 μm. After allowing to stand for a predetermined time, baking was made at 140° C. for 30 minutes. Subsequently, the respective steel plates coated with the intermediate paints were further coated with an alkyd resin finish coat paint (Melami No. 1500 black: the trade name of Nihon Oil & Fats Co., Ltd.) to have a paint film thickness of 35 to 40 μm. Then baking was made for each steel plate with the finish coat.

Examples 1 to 12 and Comparative Examples 1 to 15

Concerning a variety of painting systems as shown in Table 2, edge corrosion (rust) resistance and hardening characteristics of the coated electrodeposition paint and finish condition of the finish coat paint were evaluated. The painting systems of Comparative Examples 1 to 15 are not within the scope of the present invention, while the painting systems of Examples 1 to 12 are within the scope of the present invention.

In Table 2, "Emulsion (EP/BI)" represents an emulsion which was obtained by neutralizing with acid and emulsifying a reaction product formed by a reaction between epoxy resin (EP) containing residual bisphenol A and completely blocked isocyanate (BI).

A "Flow intermediate coat" is an intermediate coat using an intermediate coat paint which has a good flowability during hardening under baking.

The edge corrosion resistance in Table 2 was measured by the following method: A steel cutter knife blade (LB-10: trade name of OLFA Corporation in Japan) was chemically treated with PBL3020 (the trade name of Nihon Parkerizing Co., Ltd in Japan). Each of the above-mentioned nine kinds of electrodepositon paints was coated on the chemically treated knife blade and thereafter coated with the electrodeposition paint. Then, the coated electrodeposition paint was baked at 175° C. for 30 minutes. Thereafter the knife blades coated with the electrodeposition paints were subjected to a salt water spraying test of 168 hours. After the test, the number of rusted points at the edge section was counted as shown in Table 2.

TABLE 2

| Painting system | | Comparative Example | | | | | | |
|---|---|---|---|---|---|---|---|---|
| | | 1 | 2 | 3 | 4 | 5 | 6 | 7 |
| Content (part by weight in solid) of each composition of electrodeposition paint and hardening characteristics (by OPA) | Production No. | 15 | 17 | 15 | 17 | 15 | 17 | 15 |
| | Pigment paste | 350 | 350 | 350 | 350 | 350 | 350 | 350 |
| | Emulsion (EP/BI) | 650 | 650 | 650 | 650 | 650 | 650 | 650 |
| | Gel particulate | — | 800 | — | 800 | — | 800 | — |
| | Minimum melt viscosity ($\lambda$) | 0.15 | 0.45 | 0.15 | 0.45 | 0.15 | 0.45 | 0.15 |
| Hardening characteristics of intermediate coat paint (hardening starting time (min) by OPA) | Conventional intermediate coat (13 min) | Production No. 18 | Production No. 18 | — | — | — | — | — |
| | Flow intermediate coat (15 min) | — | — | Production No. 19 | Production No. 19 | — | — | — |
| | Flow intermediate coat (20 min) | — | — | — | — | Production No. 20 | Production No. 20 | — |
| | Flow intermediate coat (23 min) | — | — | — | — | — | — | Production No. 21 |
| | Flow intermediate coat (25 min) | — | — | — | — | — | — | — |
| Edge corrosion resistance (number of rusted points) 168 hr | | 100< | 0–1 | 100< | 0–1 | 100< | 0–1 | 100< |
| PDG value after coating of finish coat paint 168 hr | On horizontal plane | 1.0 | 0.80 | 1.0 | 0.80 | 1.0 | 0.90 | 1.0 |
| | On vertical plane | 0.60 | 0.60 | 0.60 | 0.60 | 0.60 | 0.60 | Slight run occurred (0.50) |

| Painting system | | Comparative Example | | | | | | | |
|---|---|---|---|---|---|---|---|---|---|
| | | 8 | 9 | 10 | 11 | 12 | 13 | 14 | 15 |
| Content (part by weight in solid) of each composition of electrodeposition paint and hardening characteristics (by OPA) | Production No. | 17 | 15 | 17 | 16 | 16 | 16 | 16 | 16 |
| | Pigment paste | 350 | 350 | 350 | 350 | 350 | 350 | 350 | 350 |
| | Emulsion (EP/BI) | 650 | 650 | 650 | 650 | 650 | 650 | 650 | 650 |
| | Gel particulate | 800 | — | 800 | 100 | 100 | 100 | 100 | 100 |
| | Minimum melt viscosity ($\lambda$) | 0.45 | 0.15 | 0.45 | 0.18 | 0.18 | 0.18 | 0.18 | 0.18 |
| Hardening characteristics of intermediate coat paint (hardening starting time (min) by OPA) | Conventional intermediate coat (13 min) | — | — | — | Production No. 18 | — | — | — | — |
| | Flow intermediate coat (15 min) | — | — | — | — | Production No. 19 | — | — | — |
| | Flow intermediate coat (20 min) | — | — | — | — | — | Production No. 20 | — | — |
| | Flow intermediate coat (23 min) | Production No. 21 | — | — | — | — | — | Production No. 21 | — |
| | Flow intermediate coat (25 min) | — | Production No. 22 | Production No. 22 | — | — | — | — | Production No. 22 |
| Edge corrosion resistance (number of rusted points) 168 hr | | 0–1 | 100< | 0–1 | 70–80 | 70–80 | 70–80 | 70–80 | 70–80 |
| PDG value after | On horizontal | 0.090 | 1.0 | 0.90 | 0.90 | 0.90 | 1.0 | 1.0 | 1.0 |

TABLE 2-continued

| | | | | | | | | |
|---|---|---|---|---|---|---|---|---|
| coating of finish coat paint | plane On vertical plane | Slight run occurred (0.50) | run occurred (0.40) | * run occurred (0.40) | 0.60 | 0.60 | 0.60 | Slight run occurred (0.50) | run occurred (0.40) |

| | | Example | | | | | | |
|---|---|---|---|---|---|---|---|---|
| Painting system | | 1 | 2 | 3 | 4 | 5 | 6 | 7 |
| Content (part by weight in solid) of each composition of electrodeposition paint and hardening characteristics (by OPA) | Production No. | 13 | 13 | 9 | 9 | 10 | 10 | 11 |
| | Pigment paste | 350 | 350 | 350 | 350 | 350 | 350 | 350 |
| | Emulsion (EP/BI) | 650 | 650 | 650 | 650 | 650 | 650 | 650 |
| | Gel particulate | 125 | 125 | 200 | 200 | 200 | 200 | 250 |
| | Minimum melt viscosity (λ) | 0.20 | 0.20 | 0.25 | 0.25 | 0.25 | 0.25 | 0.28 |
| Hardening characteristics of intermediate coat paint (hardening starting time (min) by OPA) | Flow intermediate coat (15 min) | Production No. 19 | — | Production No. 19 | — | Production No. 19 | — | Production No. 19 |
| | Flow intermediate coat (20 min) | — | Production No. 20 | — | Production No. 20 | — | Production No. 20 | — |
| Edge corrosion resistance (number of rusted points) 168 hr | | 0–10 | 0–10 | 0–10 | 0–10 | 0–10 | 0–10 | 0–1 |
| PDG value after coating of finish coat paint | On horizontal plane | 1.0 | 1.0 | 1.0 | 1.0 | 1.0 | 1.0 | 1.0 |
| | On vertical plane | 0.60 | 0.60 | 0.60 | 0.60 | 0.60 | 0.60 | 0.60 |

| | | Example | | | | |
|---|---|---|---|---|---|---|
| Painting system | | 8 | 9 | 10 | 11 | 12 |
| Content (part by weight in solid) of each composition of electrodeposition paint and hardening characteristics (by OPA) | Production No. | 11 | 12 | 12 | 14 | 14 |
| | Pigment paste | 350 | 350 | 350 | 350 | 350 |
| | Emulsion (EP/BI) | 650 | 650 | 650 | 650 | 650 |
| | Gel particulate | 250 | 400 | 400 | 700 | 700 |
| | Minimum melt viscosity (λ) | 0.28 | 0.33 | 0.33 | 0.38 | 0.38 |
| Hardening characteristics of intermediate coat paint (hardening starting time (min) by OPA) | Flow intermediate coat (15 min) | — | Production No. 19 | — | Production No. 19 | — |
| | Flow intermediate coat (20 min) | Production No. 20 | — | Production No. 20 | — | Production No. 20 |
| Edge corrosion resistance (number of rusted points) 168 hr | | 0–1 | 0–1 | 0–1 | 0–1 | 0–1 |
| PDG value after coating of finish coat paint | On horizontal plane | 1.0 | 1.0 | 1.0 | 1.0 | 1.0 |
| | On vertical plane | 0.60 | 0.60 | 0.60 | 0.60 | 0.60 |

What is claimed is:

1. A paint composition for coating metal surfaces to which an overlayer paint (II) is to be coated thereover, the overlayer paint having a hardening starting time as determined according to a logarithmic decrement of viscoelasticity of said overlayer paint and by an oscillated pendulum type viscoelasticity measuring device ranging from 15 to 20 minutes, said paint composition consisting essentially of:

a cathodic electrodeposition paint composition consisting essentially of:

(a) a water based composition (A) in an amount ranging from 50 to 85 parts by weight upon conversion to a solid content, said water based composition consisting essentially of:

i) a reaction product (A-1) formed by a reaction between a epoxy resin having a number average molecular weight ranging from 100 to 3000 and at least one epoxy group per molecule on an average and containing a residual bisphenol A, and a monatomic secondary amine, said reaction product being present in an amount ranging from 60 to 80 parts by weight upon conversion to a solid content, and ii) a blocked reaction product (A-2) formed by a reaction between a compound having 1 to 8 carbon atoms and having one OH group per molecule on an average, and a compound having at least two NCO groups per molecule on an average, said blocked reaction product being present in an amount ranging rom 20 to 40 parts by weight upon conversion to a solid content; and (b) a partially cross-linked resin (B) formed by heating a water dispersion composition, said partially cross-linked resin being present in an amount ranging from 15 to 50 parts by weight upon conversion to a solid content, said water-dispersed composition consisting essentially of:

i) a methylol phenol compound (B-1) having an average molecular weight ranging from 200 to 1000, said methylol phenol compound being formed by a reaction between phenol and formaldehyde, said methylol phenol compound being present in an amount ranging between 20 to 50 parts by weight upon conversion to a solid content, and ii) an addition reaction product (B-2) formed by an addition of 50 to 200 millimole of a monatomic secondary amine to 100 parts by weight of a polybutadiene resin having an average molecular weight ranging from 1000 to 3000 and an oxirane oxygen concentration ranging from 4 to 8 percent by weight, said addition reaction product being present in an amount ranging from 50 to 80 parts by weight upon conversion to a solid content, wherein said cationic electrodeposition paint composition has a minimum melt viscosity not less than 0.2 during a hardening state as determined according to the logarithmic decrement of viscoelasticity of said cationic electrodeposition paint composition and by the oscillated pendulum viscoelasticity measuring device.

2. A paint composition according to claim 1, wherein said blocked reaction product (A-2) of said water based composition (A) is completely blocked.

3. A paint composition according to claim 1, wherein said reaction product (A-1) of said water based composition (A) is a cationic resin.

4. A paint composition according to claim 1, wherein said blocked reaction product (A-2) of said water based composition (A) is a blocked isocynate cross-linking agent.

5. A paint composition according to claim 4, wherein said blocked isocyanate cross-linking agent is selected from the group consisting of an aromatic diisocyanate and an aliphatic diisocyanate.

6. A paint composition according to claim 4, wherein said blocked isocyanate cross-linking agent is selected from the group consisting of 2,4-tolylene diisocyanate, 2,6-tolylene diisocyanate, hexamethylene diisocyanate, m-phenylene diisocyanate and p-phenylene diisocyanate.

7. A paint composition according to claim 4, wherein said blocked isocyanate cross-linking agent is blocked with an alcohol selected from group consisting of methanol, ethanol, butanol, 2-ethyl hexanol and benzyl alcohol.

8. A paint composition according to claim 1, wherein said methylol phenol compound (B-1) of said partially cross-linked resin (B) is a resol phenol resin.

* * * * *

UNITED STATES PATENT AND TRADEMARK OFFICE
CERTIFICATE OF CORRECTION

PATENT NO.   : 5,183,836
DATED        : February 2, 1993
INVENTOR(S)  : Hiroyuki Kishi, et al It is certified that error appears in the above-indentified patent and that said Letters Patent is hereby corrected as shown below:

On the title page, Item [75] Inventors, "Nagaoka" should read
                                --Masahide Nagaoka -- and
                                "Yasuyu Tsuchiya" should read
                                --Yasuyuki Tsuchiya--

Column 17, Claim 1, Line 66, "100" should read --1000--
Column 18, Claim 1, line 60, "rom" should read --from--

Signed and Sealed this

Seventh Day of December, 1993

Attest:

BRUCE LEHMAN

Attesting Officer

Commissioner of Patents and Trademarks